United States Patent
Bertrand

(10) Patent No.: US 6,962,075 B2
(45) Date of Patent: Nov. 8, 2005

(54) METHOD OF DETERMINING CHARACTERISTICS OF A TIRE FROM STRESSES

(75) Inventor: David Bertrand, Chamalieres (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 10/773,014

(22) Filed: Feb. 5, 2004

(65) Prior Publication Data

US 2004/0158441 A1 Aug. 12, 2004

Related U.S. Application Data

(63) Continuation of application No. PCT/EP02/08620, filed on Aug. 2, 2002.

(30) Foreign Application Priority Data

Aug. 6, 2001 (FR) .............................. 01 10565

(51) Int. Cl.⁷ .............................................. G01M 17/02
(52) U.S. Cl. ........................................................ 73/146
(58) Field of Search ............................ 152/209.28, 455, 152/526; 73/146

(56) References Cited

U.S. PATENT DOCUMENTS

| | | | |
|---|---|---|---|
| 4,817,421 A | 4/1989 | Himmier | |
| 4,836,257 A * | 6/1989 | Mamada et al. | ........ 152/209.16 |
| 5,365,781 A | 11/1994 | Rhyne | |
| 5,913,240 A | 6/1999 | Drahne et al. | |
| 6,083,268 A * | 7/2000 | Kelsey et al. | .................. 703/7 |
| 6,256,894 B1 | 7/2001 | Naruse et al. | |
| 6,338,270 B1 * | 1/2002 | Mancosu et al. | ............. 73/146 |
| 6,339,956 B1 | 1/2002 | Huinink et al. | |
| 6,761,060 B2 * | 7/2004 | Mancosu et al. | ............. 73/146 |

FOREIGN PATENT DOCUMENTS

| | | |
|---|---|---|
| EP | 0 949 496 | 10/1999 |
| EP | 1 030 170 | 8/2000 |
| WO | WO 01/92078 | 12/2001 |

OTHER PUBLICATIONS

Patent Abstracts of Japan 0 2270682, Nov. 1990.

* cited by examiner

*Primary Examiner*—William Oen
(74) *Attorney, Agent, or Firm*—Fitzpatrick, Cella, Harper & Scinto

(57) ABSTRACT

Method of determining at least one of the characteristics selected from: the three components of a resultant of forces which are exerted by the road on the contact area of a tire and the self-alignment torque generated by the tire, in which the said characteristic is derived from at least one measurement of the shear stresses at two fixed points in space, which are each situated in one of the beads.

14 Claims, 14 Drawing Sheets

Shear stresses at point A

Shear stresses at point B

METHOD OF DETERMINING CHARACTERISTICS OF A TIRE FROM STRESSES

CROSS REFERENCE TO RELATED APPLICATIONS

This application is a continuation of International Application No. PCT/EP02/08620 filed Aug. 2, 2002, which claims priority of French Application No. FR01/10565 filed Aug. 6, 2001. The priority of the International Application is claimed under 35 U.S.C. § 120, and the priority of the French Application is claimed under 35 U.S.C. § 119. The International Application was published in French, but not in English, as WO 03014687.

BACKGROUND OF THE INVENTION

The present invention relates to vehicles, and to measurement of the forces which are exerted by the road on the tires of vehicles.

The present invention also relates to the various electronic assistance devices used, for example, for antilock control of the brakes of a vehicle or antiskid control of the drive wheels, control of the trajectory of a vehicle or other forms of control or monitoring, for instance the pressure of the tires.

In order to control the handling of a vehicle, attempts have been made to determine certain rolling parameters. For instance, in order to reduce the longitudinal slip of the wheels, slip limitation systems (A.B.S., A.S.R.) have been developed which are capable of modulating the torque transmitted to the wheel by the engine or the brake, as a function of the slip derived from the variations in speed of rotation of each wheel. It has also been proposed to measure the torsion (circumferential angular deformation) of the sidewalls of a tire, in order to determine the variations in the torque transmitted to the road. This measurement, which is more direct than derivation from the variation in the speed of rotation, can allow more refined control of the slip limitation systems.

Systems (such as E.S.P.) are also known which influence the brakes or the drive power applied to the wheels, in order to ensure that the trajectory desired by the driver is actually followed by the vehicle. In order to do this, the yaw velocity (velocity of rotation of the vehicle about a vertical axis), the rolling speed, the transverse acceleration of the vehicle and the angular position which the driver applies to the steering wheel, are generally measured simultaneously.

SUMMARY OF THE INVENTION

The invention starts from the observation that all the forces exerted by the road on the vehicle are transmitted via the wheels. It is the balance of these forces which dictates the accelerations experienced by the vehicle. Therefore, determining all these forces could make it possible to dispense with the various sensors mentioned above, or to complement them in order to provide more complete information.

The method of the invention is based on recognition of the fact that the forces acting between the tread of the tire and the road cause a substantial and reproducible modification of the stresses in the bead. These stresses, if one manages to measure them individually during rotation of the tire in real time, can make it possible to know at each instant the direction and magnitude of the forces acting on the tire, as well as the sign and the magnitude of the self-alignment torque exerted by the tire.

Owing to its design and its mode of operation, the deformations and the internal stresses generated in the tire when it is constrained depend on its inflation pressure. The inflation pressure is therefore one of the parameters of the method proposed here. This pressure may be known through a specific measurement means which is independent of the measurements taken in the context of this invention, an example of such a means being a pressure sensor. This pressure may also proceed from specific processing of the measurement of the stresses.

Under actual conditions of use, the tire is frequently subjected to variations in the camber angle. This leads to a modification of the deformations of the tire and of the distribution of the stresses in the bead. The camber is therefore one of the parameters of the method proposed here. The camber may be known through a specific measurement means which is independent of the measurements taken in the context of this invention, an example of such a means being a camber angle sensor. This camber may also proceed from specific processing of the measurement of the stresses in the beads.

The invention proposes a method of determining at least one of the characteristics selected from: the three components of a resultant of forces which are exerted by the road on the contact area of a tire, the self-alignment torque generated by the tire, the camber and the pressure, the characteristic being derived from at least one measurement of the stresses at at least three fixed points in space, which are situated in one of the beads. Preferably, the said at least three fixed points in space are such that:

one of the points corresponds to the azimuth of the center of the contact area or the azimuth of the point opposite to the contact area;

the other two points are symmetrical with respect to a vertical plane passing through the center of the contact area.

The rest of the description presents the case in which shear stresses are measured. This approach, however, should not be considered as implying limitation, and other measurements of stresses, for example flexural or compressive stresses observed at the same positions, may also make it possible to determine the same characteristics.

In a preferred embodiment, the invention proposes to estimate the shear stress in the bead in the circumferential direction. The measurement of the shear stresses may, for example, be carried out in the zone where the carcass is anchored in the bead, preferably in a rubber component whose Young's modulus is fairly high, preferably more than 5 MPa at 10% strain. For example, a sensor is installed in the rubber constituent superimposed on the bead wire although this is only a particular case among many possible configurations, depending on the design of the tires.

BRIEF DESCRIPTION OF THE DRAWINGS

The rest of the description explains the invention in more detail with the aid of the appended figures, in which.

Figure 1:
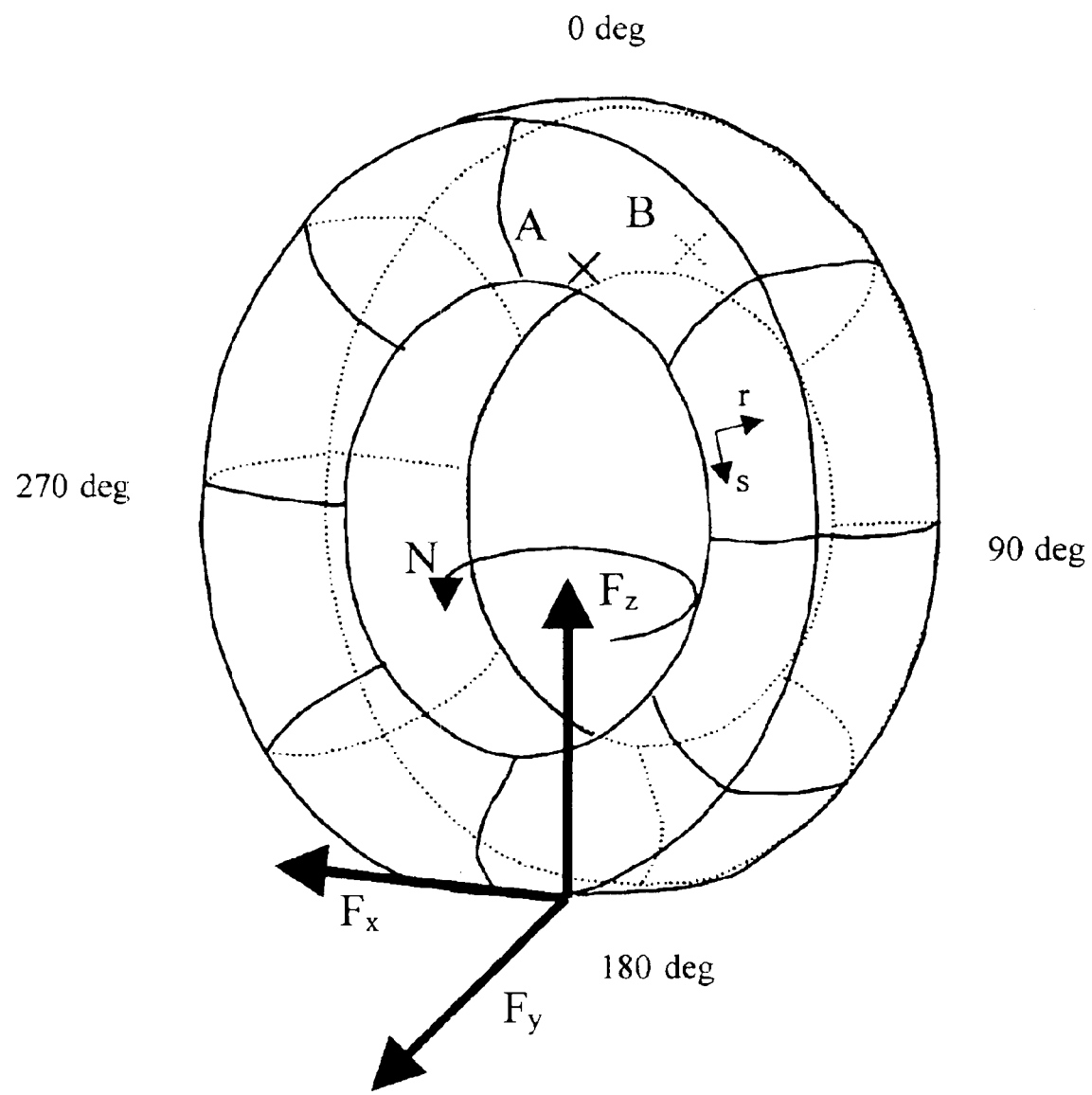
FIG. 1 is a perspective of a tire on which the conventions useful for understanding the invention are defined; the circumferential shear stress corresponds to the shear between the radial direction (denoted r in the figure) and the circumferential direction (denoted "c" in the figure). This shear stress will be denoted $\sigma_{rs}$
Figure 2A:
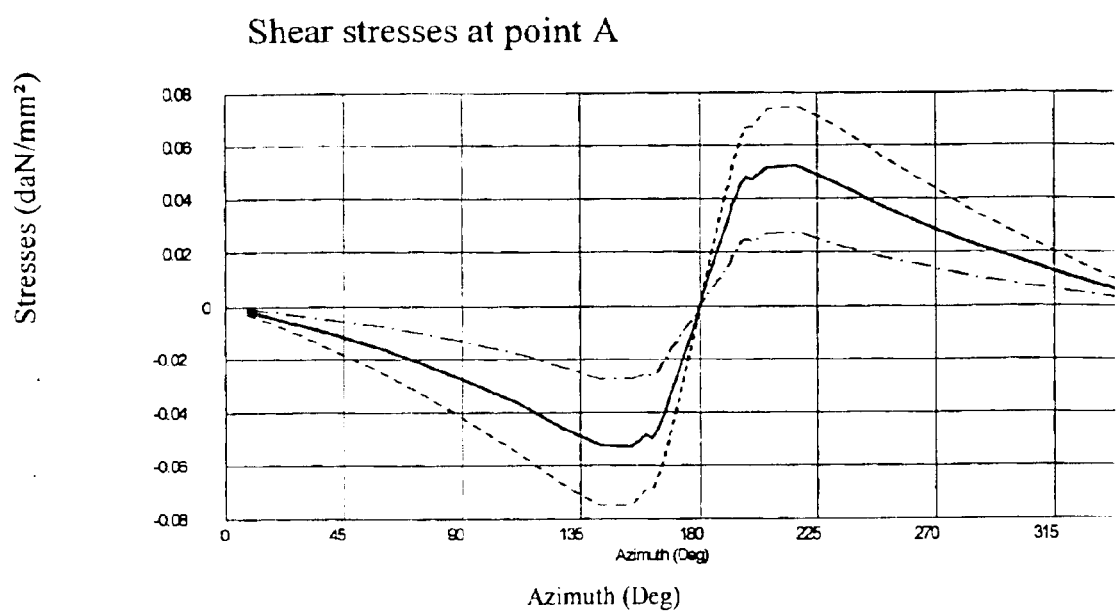
FIG. 2a shows the effect of the vertical component Fz on the stress $\sigma_{rs}$ for Point A of the tire of FIG. 1, where.
Figure 2B:
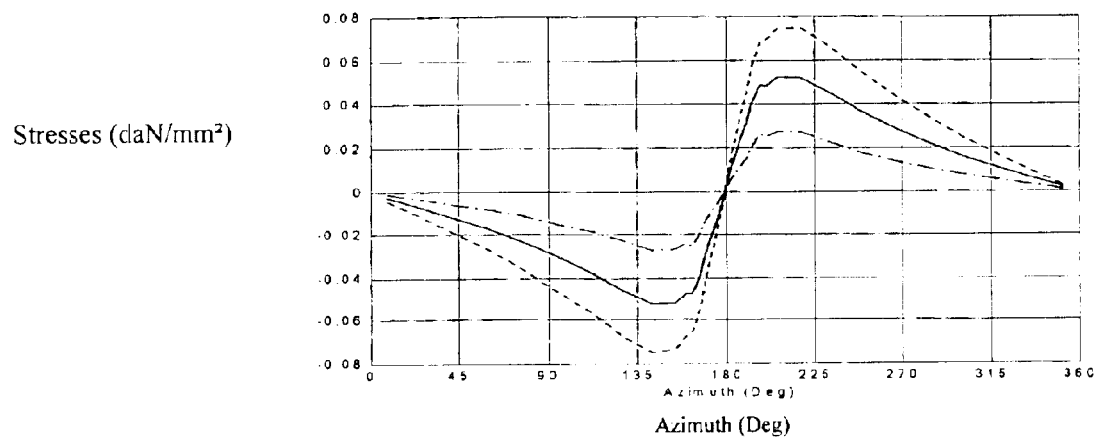
Figure 3A:
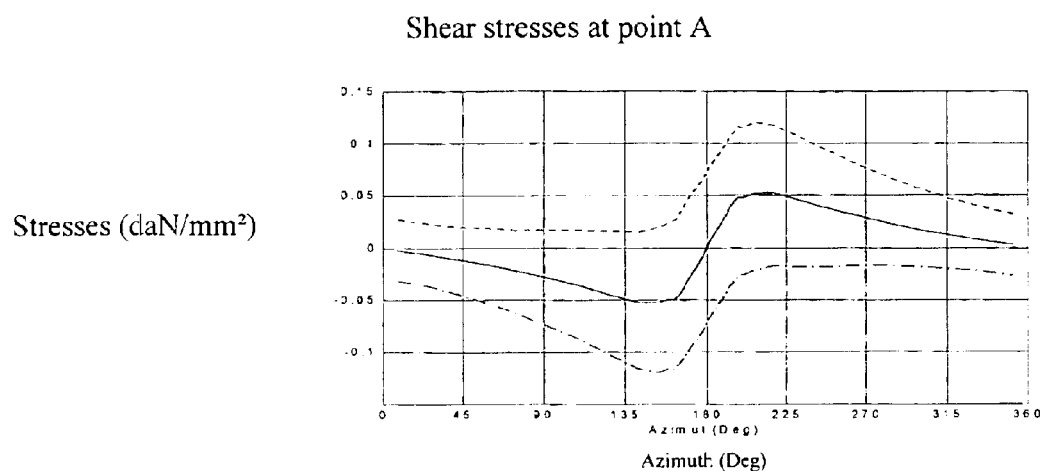
Figure 3B:
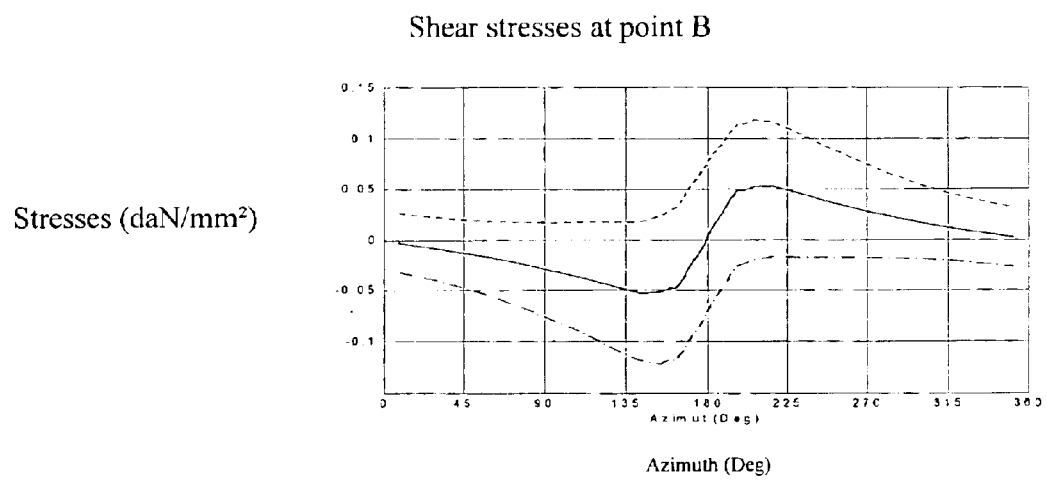
Figure 4A:
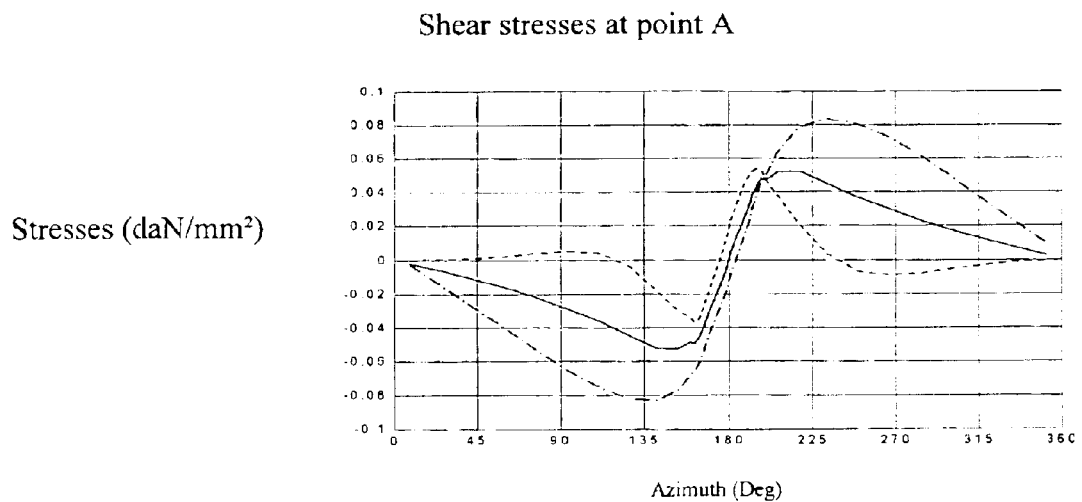
Figure 4B:
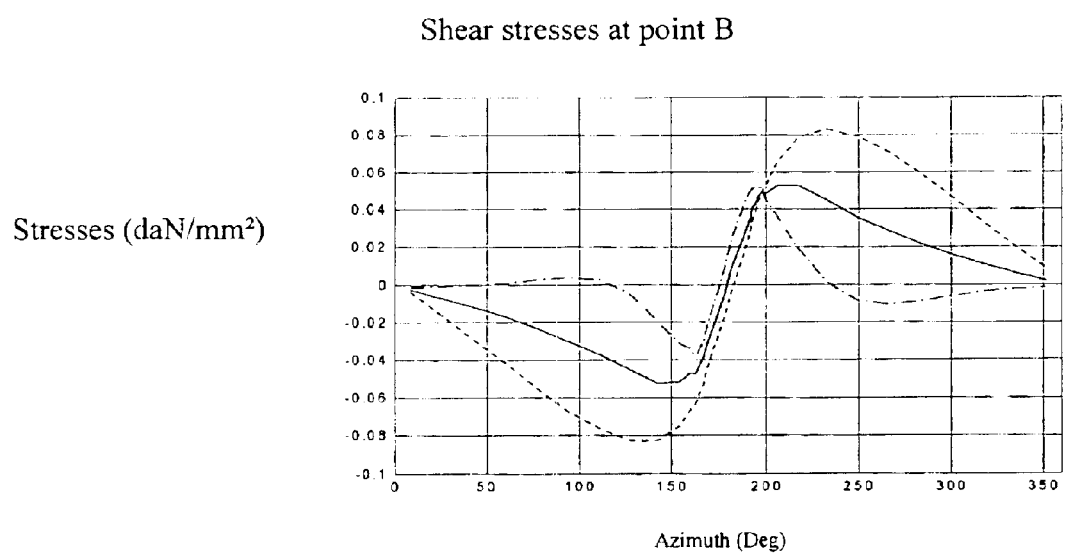
Figure 5:
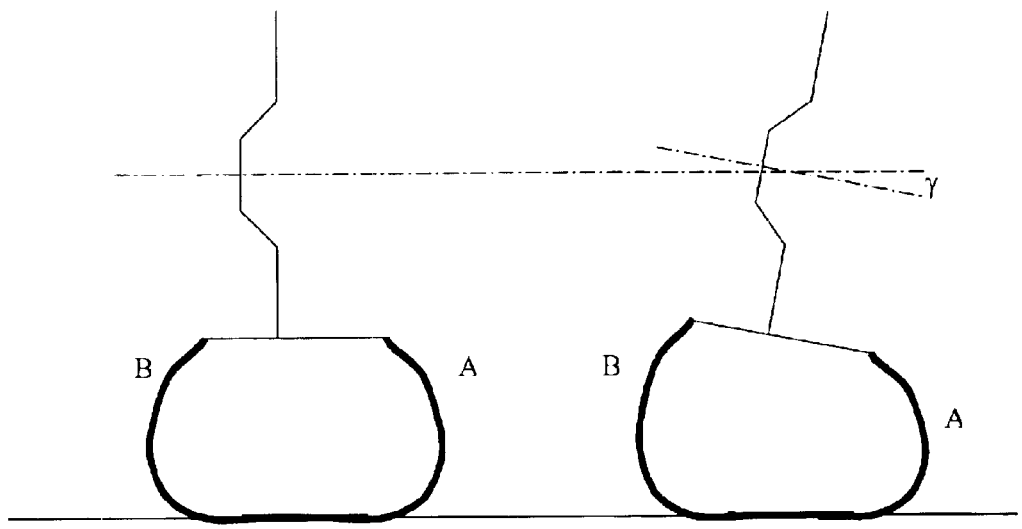
Figure 6A:
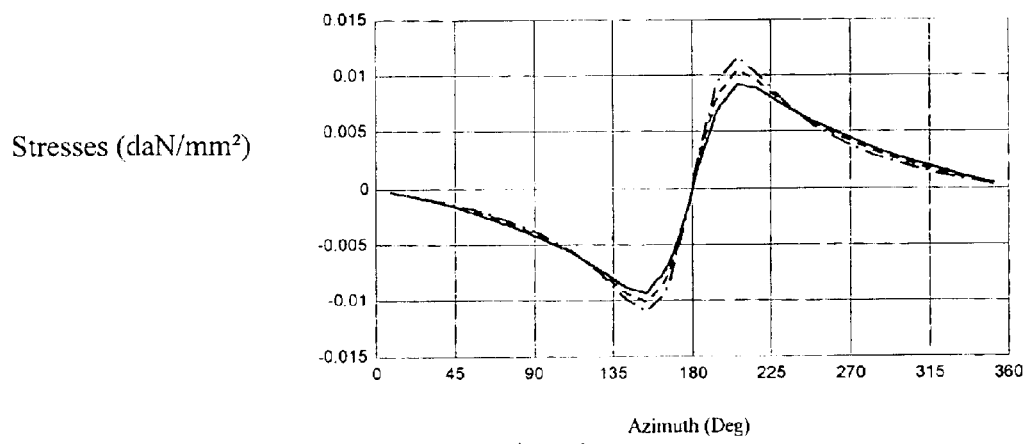
Figure 6B:
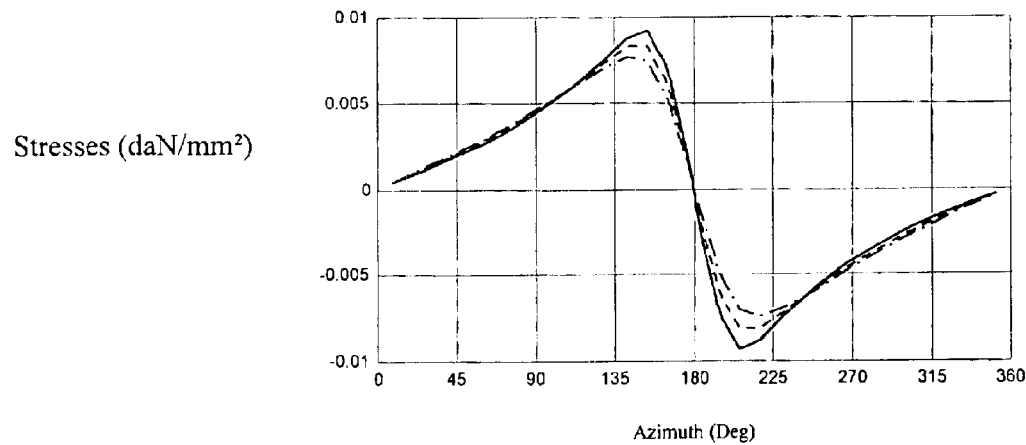
Figure 7:
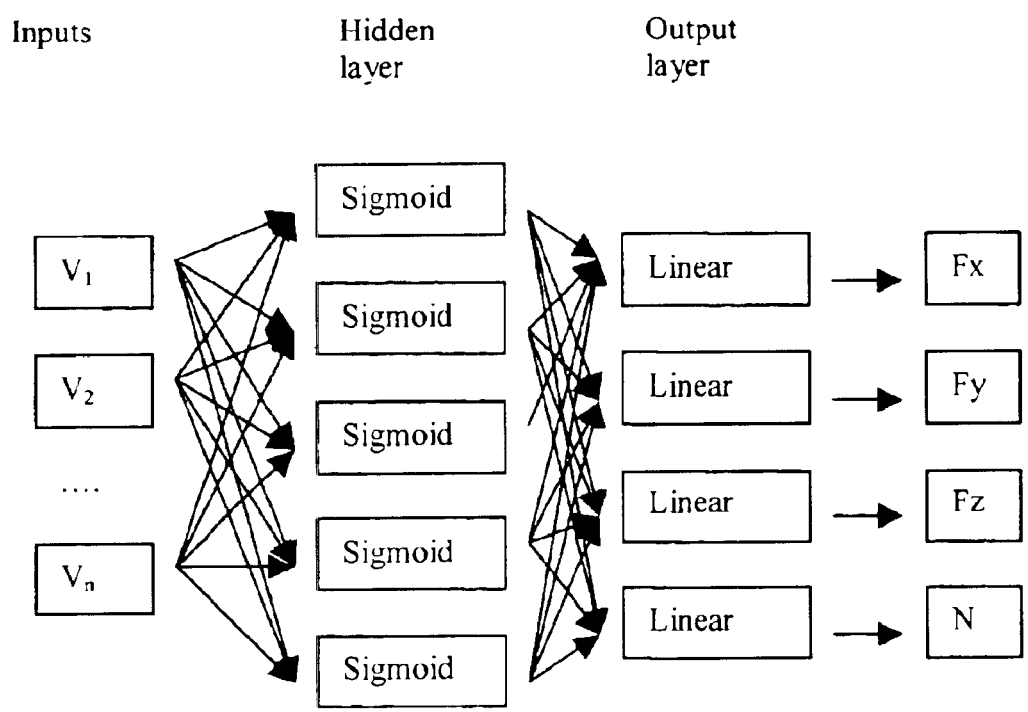
Figure 8:
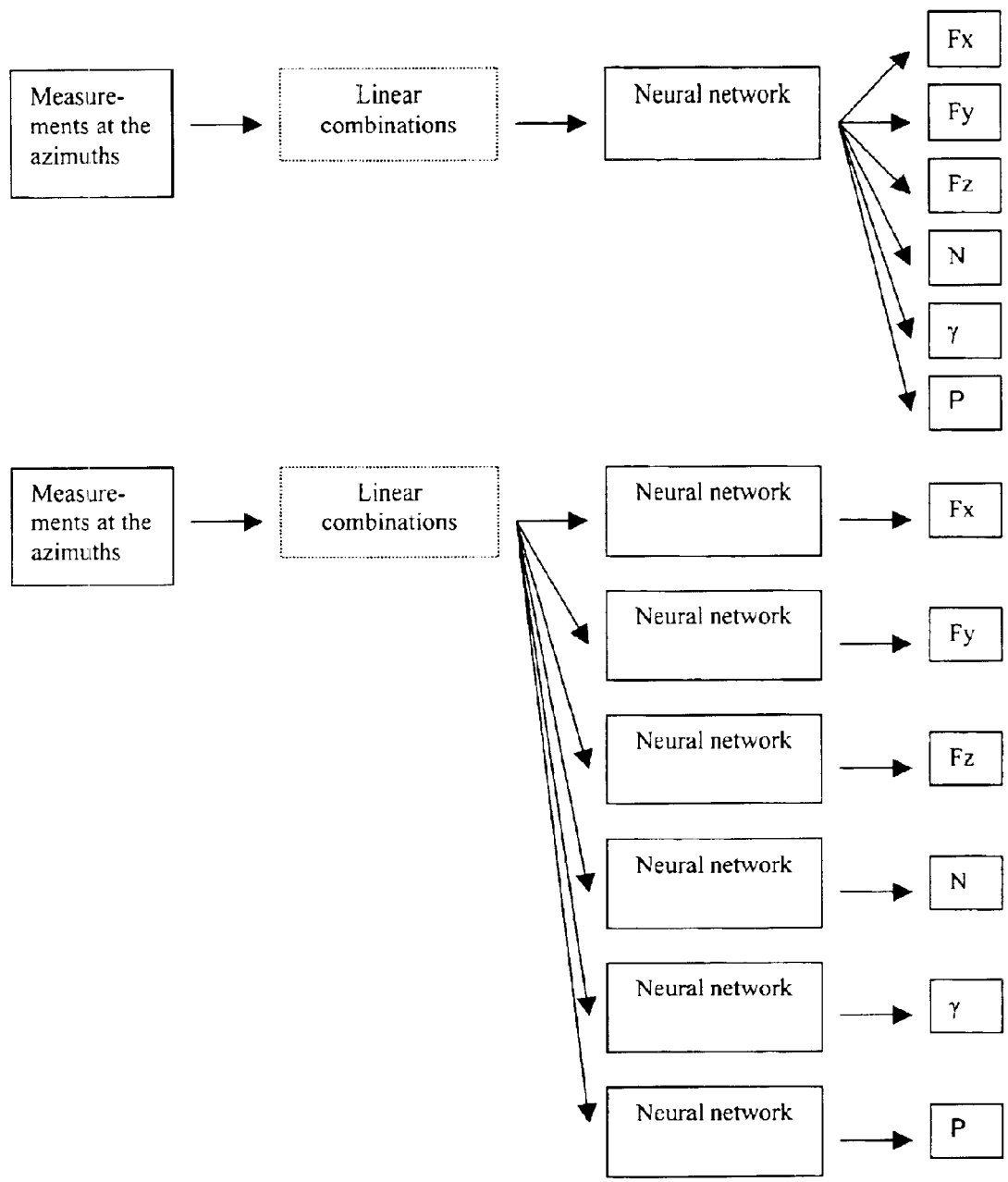
Figure 9A:
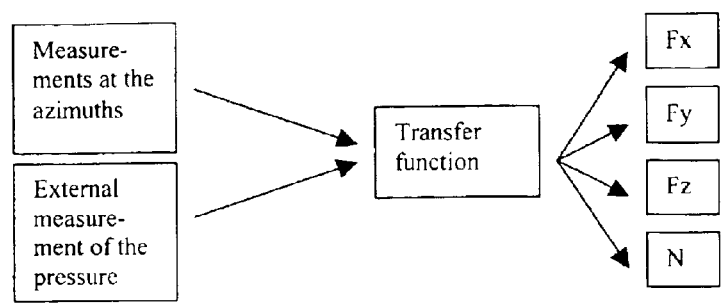
Figure 9B:
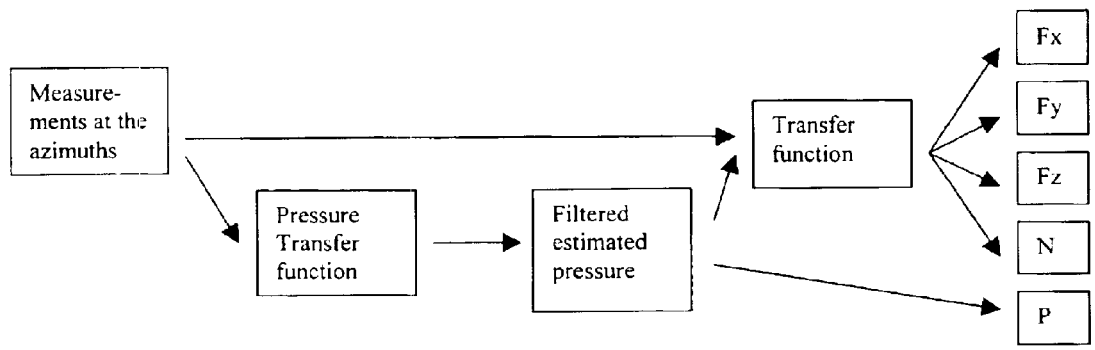
Figure 10:
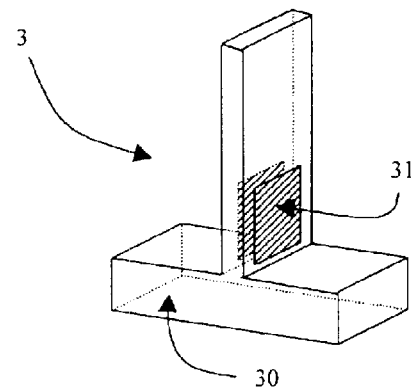
Figure 11:
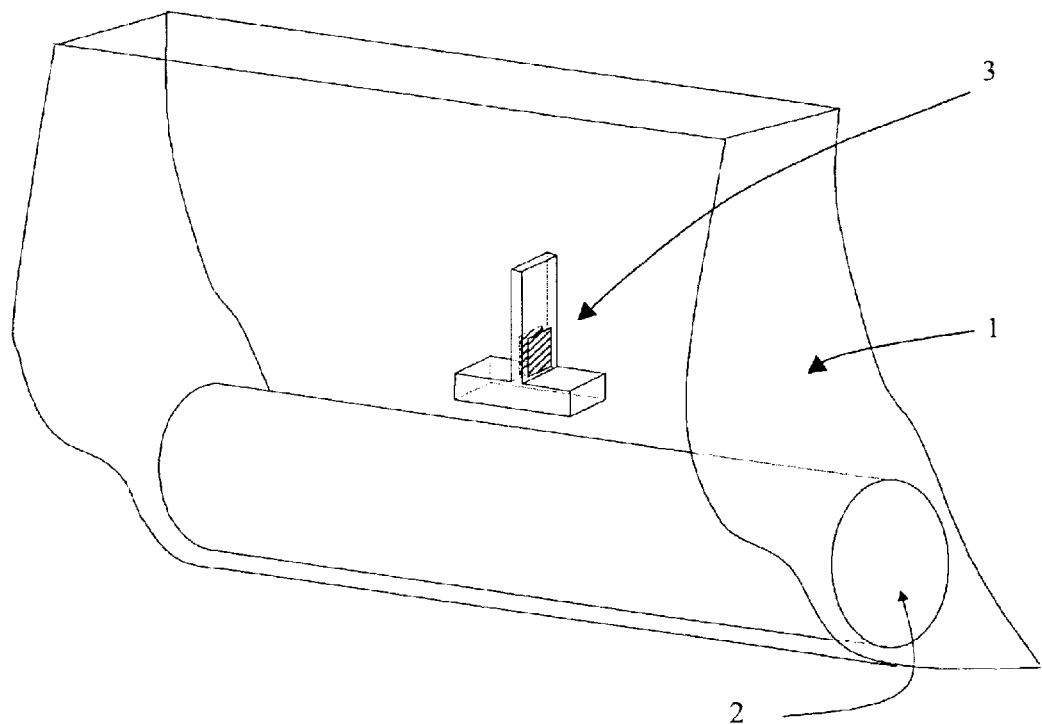
Figure 12:
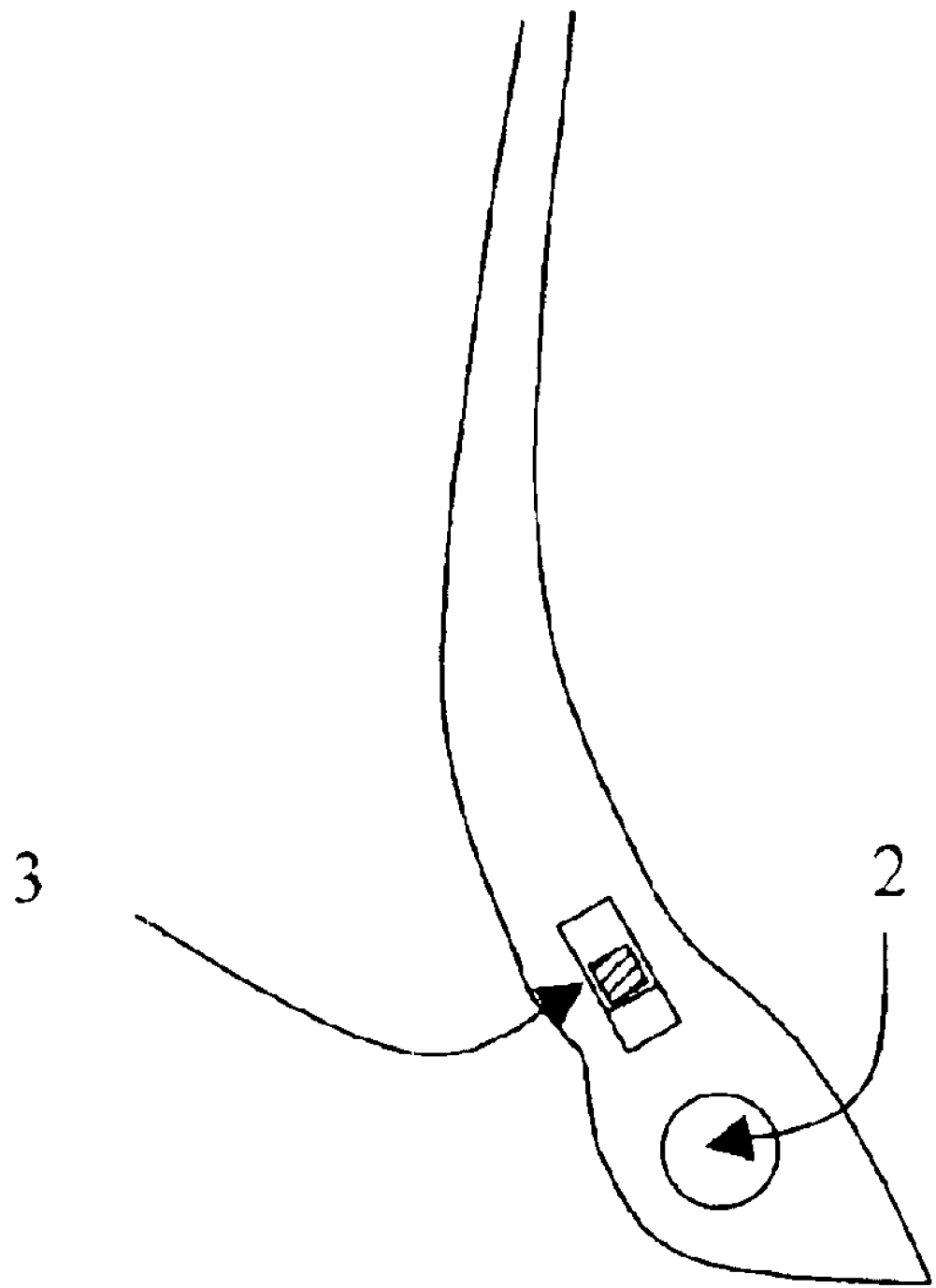
Figure 13:
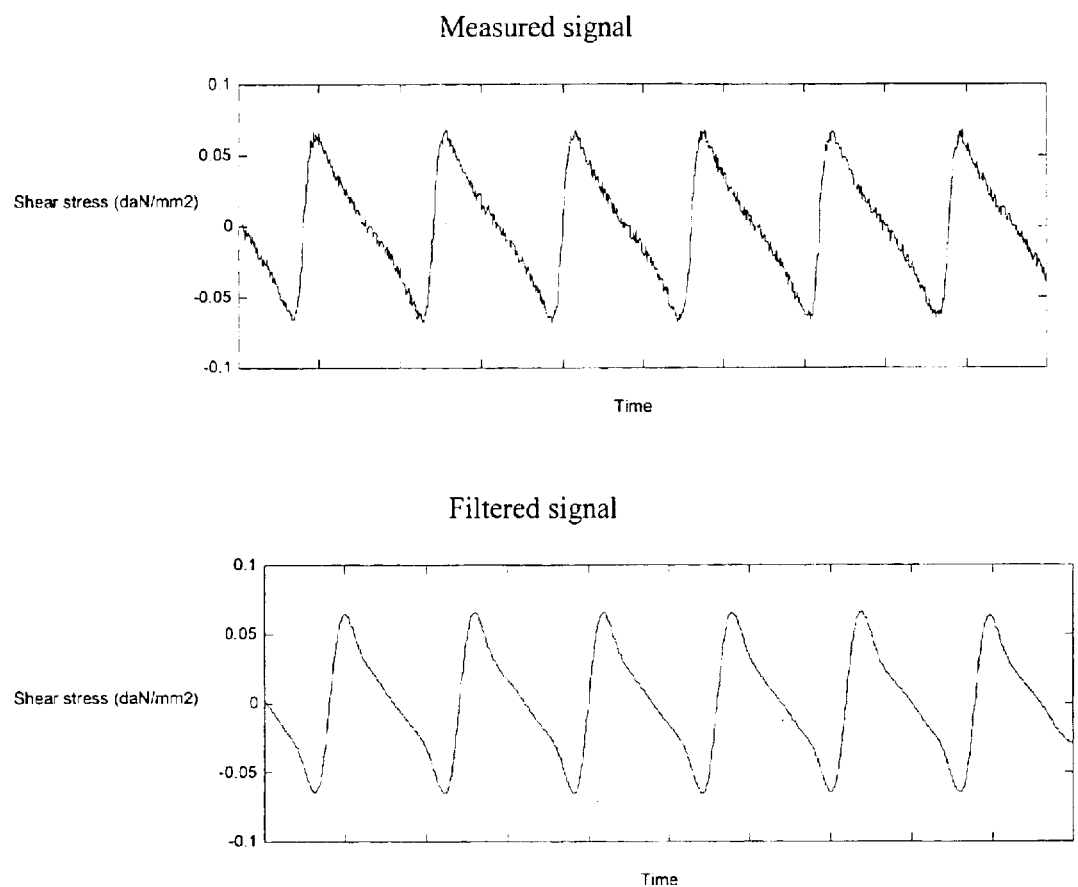
Figure 14:
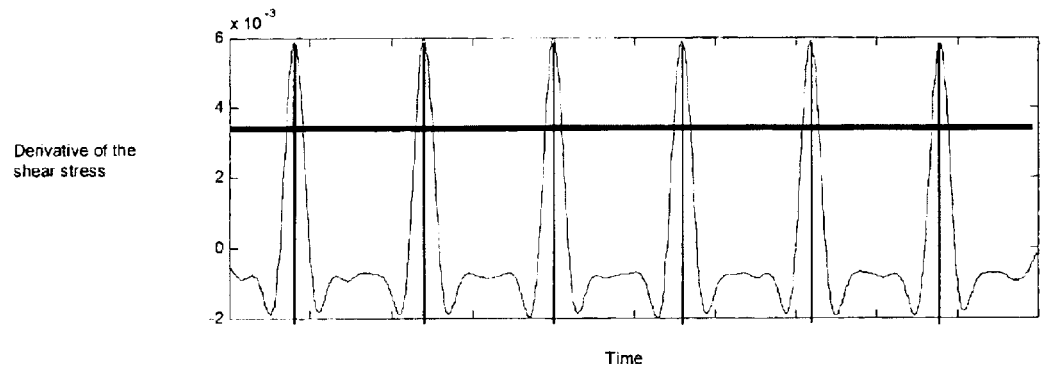
Figure 15:
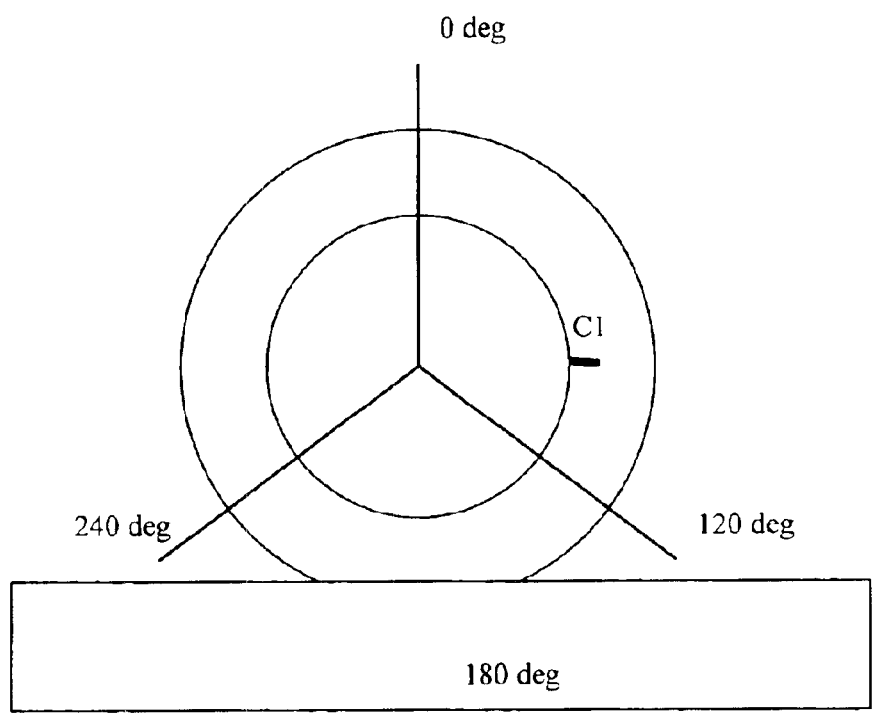
Figure 16:
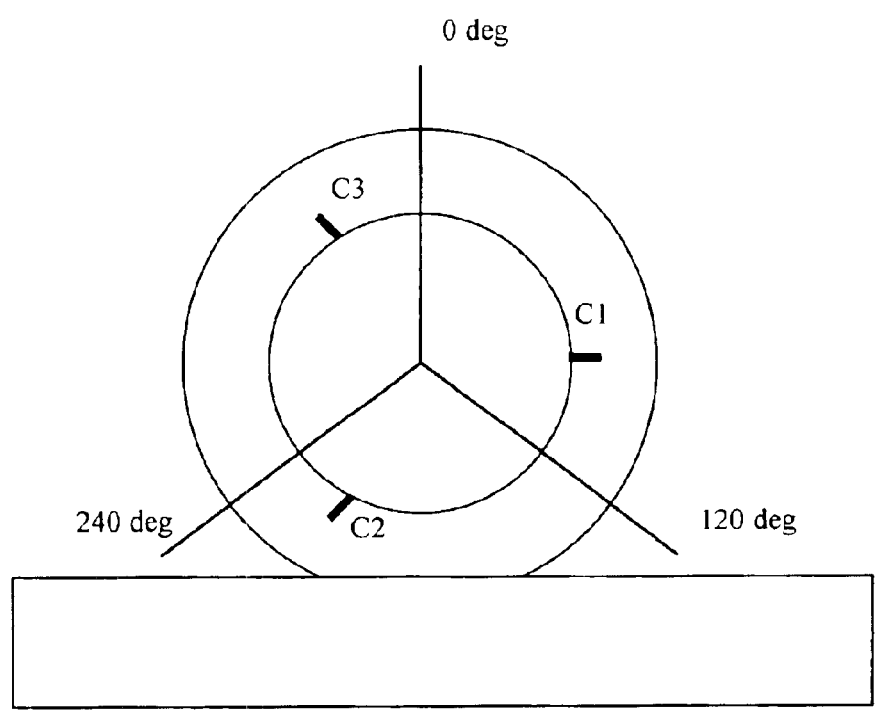
Figure 17:
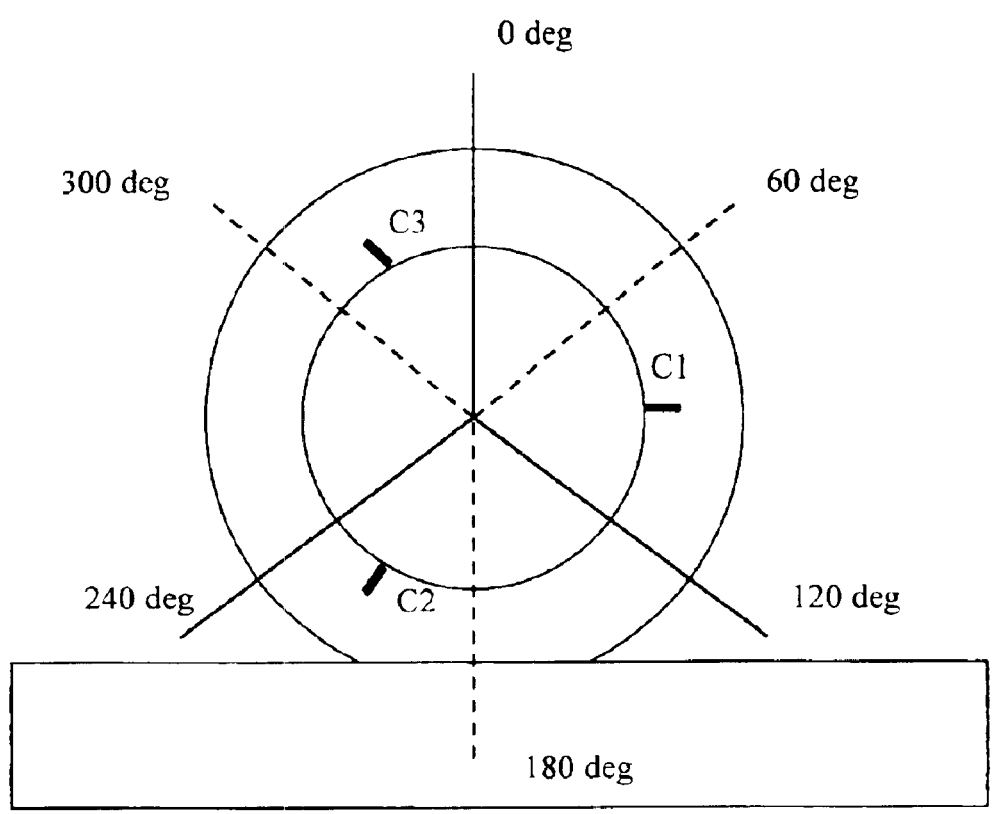

a. the solid curve corresponds to a vertical load of 400 daN, b. the dotted curve corresponds to a vertical load of 500 daN, and c. the dotted and dashed curve corresponds to a vertical load of 300 daN;

FIG. 2b shows the effect of the vertical component Fz on the stress $\sigma_{rs}$ for Point B of the tire of FIG. 1, the curves representing the same loads as in FIG. 2a;

FIG. 3a shows the effect of the component Fx on the stress $\sigma_{rs}$ for Point A shown in the tire of FIG. 1, where:

a. the solid curve corresponds to a vertical load of 400 daN and an absence of any force Fx, b. the dotted curve corresponds to a vertical load of 400 daN and a force Fx of −400 daN (braking), and c. the dotted and dashed curve corresponds to a vertical load of 400 daN and a force Fx of 400 daN (driving);

FIG. 3b shows the effect of the component Fx on the stress $\sigma_{rs}$ for Point B of the tire shown in FIG. 1;

FIGS. 4a and 4b show the effect of the component Fy on the stress $\sigma_{rs}$:

a. where the solid curve corresponds to a vertical load of 400 daN without any force Fy, b. where the dotted curve corresponds to a vertical load of 400 daN with a force Fy of 280 daN, and c. where the dotted and dashed curve corresponds to a vertical load of 400 daN with a force Fy of −280 daN;

FIG. 4b shows the effect of the component Fy on the stress $\sigma_{rs}$ for Point B of the tire shown in FIG. 1;

FIG. 5 shows the deformation of the tire when a camber angle is applied;

FIG. 6a shows the effect of the camber on the shear stress signals for Point A of the tire as shown in FIG. 1, where:

a. the solid curve corresponds to a vertical load of 400 daN without any forces Fx and Fy, and to a zero camber angle, b. the dotted curve corresponds to a vertical load of 400 daN with a camber angle of 2°, and c. the dotted and dashed curve corresponds to a vertical load of 400 daN with a camber angle of 4°;

FIG. 6b shows the effect of the camber on the shear stress signals for Point B of the tire shown in FIG. 1;

FIG. 7 shows the architecture of a neural network;

FIG. 8 shows examples of transfer functions;

FIG. 9a shows an example of an architecture allowing the inflation pressure of the tire to be taken into account if it varies using a dedicated pressure measuring device;

FIG. 9b shows an example of an architecture allowing the inflation pressure of the tire to be taken into account if it varies using the stress sensor to derive pressure;

FIG. 10 shows an example of a shear stress sensor consisting of an inverted T-shaped test body equipped with two stress gauges;

FIG. 11 shows a perspective section view of an example of the installation of the sensor presented in FIG. 7 in the region of the bead of the tire;

FIG. 12 shows in section view in the meridian plane an example of the installation of the sensor presented in FIG. 7 in the region of the bead of the tire;

FIG. 13 shows the raw and filtered time signal;

FIG. 14 shows the identification of passage through the contact area on the basis of the time signal;

FIG. 15 shows an example of operation with one sensor and one model;

FIG. 16 shows an example of operation with three sensors and one model;

FIG. 17 shows an example of operation with three sensors and two models where:

a. the positions indicated by solid lines represent the azimuths at which the measurements for use as the input for model 1 are to be taken, b. the positions indicated by dotted lines represent the azimuths at which the measurements for use as the input for model 2 are to be taken, and c. C1, C2 and C3 represent the azimuthal positions of the sensors on the bead of a tire.

DETAILED DESCRIPTION OF THE INVENTION

The method described here relies on the fact that each force applied to the tire in the contact area causes a modification of the shear stress in the bead. The case of an inflated tire mounted on its wheel will be considered, on whose first bead a point A is identified at the level of the bead. On the second bead, at the same azimuth as A and on the same radius, a point B is selected. In the absence of any forces being applied to the tire, the shear stress is constant as a function of the angle of rotation of the tire-wheel assembly, and it corresponds to the residual inflation stress.

When the tire is subjected to forces, the following effects are observed for each of the components of the said forces:

The vertical component (denoted by Fz here) presses the tire onto the ground. By creating a contact area, it leads to a variation of the shear stress at point A when the fitted assembly is in rotation. FIGS. 2a and 2b indicate the shear stress, respectively at point A and at point B, as a function of the azimuth where they lie. The tire belt is connected to the bead via the sidewalls. The increase of the applied vertical component leads to a vertical displacement of the wheel with respect to the tire belt. The sidewalls then shear the bead in opposite directions at the entry and exit of the contact area. It also worth noting that the shear stress remains zero at the azimuth of the center of the contact area, as well as at the point opposite to the center of the contact area.

The horizontal component in the rolling direction (denoted by Fx here) is created by a driving or braking torque applied to the wheel. This entails a rotation of the wheel with respect to the tire belt. The sidewalls are carried along by the belt and shear the bead over all the azimuths. FIGS. 3a and 3b illustrate the effects of the component Fx of the applied forces by indicating the shear stress at points A and B, as a function of the azimuth where they lie. When a positive force Fx is applied (driving torque), the shear stress, as it is defined, decreases over all the azimuths on both beads. When a negative force Fx is applied (braking torque), the shear stress increases over all the azimuths on both beads.

The horizontal component in the transverse direction (denoted by Fy here) mainly causes differentiation between the two beads. FIGS. 4a and 4b illustrate the effects of this type of constraint by indicating the shear stress at points A and B, as a function of the azimuth where they lie. In the case of a constraint with positive Fy, one of the beads shows an increase in the shear stress on the entry side of the contact area and a decrease on the exit side. The other bead shows a decrease in the shear stress on the entry side of the contact area and an increase on the exit side. In contrast to when a load is applied, a variation of the shear stress in opposite directions at the points with azimuths 180° and 0° is observed on the two beads when a force Fy is applied.

The self-alignment torque N (moment about the vertical axis) is not, strictly speaking, a force which is imposed. Rather, it is a consequence of the way in which the components Fx, Fy and Fz are applied in the contact area. If the point of application of the resultant, whose components are Fx, Fy and Fz, is not the center of the contact area, this resultant generates a moment about Oz, which is referred to as the self-alignment torque. The existence of this moment principally entails a rotation of the contact area about Oz. The consequence of this effect is, for example, an increase in the shear stress in one bead at the azimuth of the center of the contact area and a decrease in the shear stress in the other bead at the same azimuth, with respect to a situation with zero self-alignment torque.

In the event that a camber angle is applied to the tire, the behavior of the two beads is different. Simplistically, everything happens as if one bead were carrying more load than the other. FIG. 5 illustrates this behaviour by comparing a cross section of the part of the tire in the contact area without any camber and with a camber y. This also results in a slight lateral displacement of the contact area, which entails a thrust in the Y direction. FIGS. 6a and 6b show the change of the shear stresses in the two beads. On the overloaded bead (point A), the change is similar to that of a load increase. On the other bead (point B), a change is seen which is compatible with a decrease in the load being supported. Given that the changing of the signals is odd in relation to the beads and odd in relation to the azimuth, just like the effect of Fy, it is readily possible to distinguish an effect of the camber from an effect of the Fx, Fz or N type. FIGS. 4 and 6(a and b) furthermore show that the effects of Fy and of the camber angle differ. It is therefore possible to establish an unambiguous relationship between the stress signals and the camber. It is then possible to estimate the value of the camber angle at which the tire is working, with the aid of the measurements of stresses in the bead.

The apparent rigidity of a tire originates both from its pneumatic behaviour (from its inflation pressure) and from its structural rigidity (rigidity of its architecture). The measured stress signals themselves also contain a pneumatic component and a structural component. For example, the stress signals of a tire inflated to 2 bar and loaded with 400 daN along Z are not identical to those delivered by the same tire at 2.5 bar and loaded with 500 daN. This difference corresponds to the structural contribution, and can make it possible to estimate the inflation pressure of the tire.

In the event that the inflation pressure varies, the relationships which link the applied forces and the stress signals are quantitatively modified, but without their nature being changed. The stresses in the beads are influenced by the pressure and by the load; they are made up of a contribution due to the "pneumatic" behaviour (that is to say dependent on the inflation pressure) and another contribution due to the structural behaviour (that is to say of the constituent materials of the tire and their arrangement), which does not change when the pressure changes, so that information about the pressure can be obtained.

The method may thus be explained firstly in the case of an inflation pressure which is assumed to be constant, for the sake of simplicity. Likewise, it will be considered below that the camber is constant and zero, in order to make the explanation clearer, and only the most interesting cases concerning this parameter will be mentioned.

Before continuing with the detailed description of several examples, in which measurement of the stresses is always carried out at at least two fixed points in space, it should be noted that there is at least one case in which a stress measurement in a single bead makes it possible to estimate one of the components of a resultant of forces. Indeed, as can be seen in FIGS. 2a, 2b, 3a, 3b, 4a and 4b, the components Fy or Fz applied in the contact area have no effect on the shear stress measured at the azimuth opposite to the contact area (azimuth 0°). The measurement of the shear stress at this point therefore makes it possible, by itself, to estimate the component Fx of the forces which are applied in the contact area.

When a constraint which mixes components Fx, Fy and Fz is applied, a superposition of the aforementioned effects on the circumferential shear stress is observed. One of the advantages of the proposed method is that it makes it possible to separate the contributions of each component of the applied constraint, so as to make it possible to estimate each of these components.

The approach which is used relies partly on significant parity characteristics, which correspond to the natural symmetries of the tire, in order to carry out this separation.

The azimuth θ will be defined as the angle at which the circumferential shear stress of the beads is analysed. The origin of the azimuth is taken on the opposite side from the center of the contact area. The center of the contact area therefore has the azimuth 180°.

The stress signal as a function of the azimuth, s(θ), can then be divided into two signals $s_p(θ)$ and $S_i(θ)$, which are such that:

$$s(\theta)=s_p(\theta)+s_i(\theta)$$

$$s_i(180+\theta)=-s_i(180-\theta)$$

$$s_p(180+\theta)=s_p(180-\theta)$$

$s_i$ is referred to as the odd part of s, and $s_p$ is referred to as the even part of s.

Likewise, let $s^1(θ)$ and $s^2(θ)$ be the signals associated with measurement of the circumferential shear stress on each of the sides of the tire. The following are defined:

$$s^p(\theta) = \frac{s^1(\theta) + s^2(\theta)}{2}$$

$$s^i(\theta) = \frac{s^1(\theta) - s^2(\theta)}{2}$$

$s^p$ is referred to as the bead-related even part and $s^i$ is referred to as the bead-related odd part.

It should be noted that this division by parity according to the beads may equally well be applied to $s_i$ and $s_p$. Four signals $s_i^i$ $s_i^p$ $s_p^i$ $s_p^p$ are then obtained on the basis of a measurement carried out on each bead.

The forces Fx, Fy, Fz and the self-alignment torque N are, owing to their orientations, linked with certain symmetries. In particular, this principle can be used to decouple the effects of the force components on the tire.

Hence, according to the observations (FIGS. 2a, 2b, 3a, 3b, 4a and 4b), the signal:

$s_p^p$ is mainly linked with the force Fx.

$s_i^i$ is mainly linked with the force Fy $s_i^p$ is mainly linked with the force Fz The symmetries which apply furthermore make it possible to confirm that the signal $s_p^i$ is principally linked with the self-alignment torque N.

By virtue of these observations, the method explained here proposes to carry out measurements of the circumferential shear stress in the bead on at least one side of the tire. Thanks to mathematical operations (linear or non-linear combinations of the measurements carried out at the various azimuths), these measurements make it possible to estimate the values of the signals $s_i^p$ $s_p^i$ $s_p^p$ and $s_i^i$ at certain azimuths, and thereby to provide an evaluation of the components of the applied force.

With a view to clarifying the procedure, some examples in which the method is used, but which are not exhaustive and in no way limit the usable configurations to those listed here, are presented here.

The case in which the measurements are carried out on only one bead will be considered.

EXAMPLE 1

The intention is to estimate the components of the forces which are applied in the contact area, and the self-alignment torque, on the basis of measurements of the circumferential shear stress measured in one bead of the tire, at three azimuths. The measurement azimuths are selected in the following way:

One of the azimuths corresponds to the middle of the contact area or the azimuth of the point opposite to the contact area (azimuth 180°). Let $V_c$ be the value measured at this point.

The other two azimuths are symmetrical with respect to the azimuth of the center of the contact area. (180°+α° and 180°−α°). Let $V_1$ and $V_2$ be the values measured at these points.

According to the observations above:

$V_2-V_1$ makes it possible to estimate the imbalance between the entry of the contact area and the exit. This value will be principally linked with the component Fz. An estimate of Fz is given by $f_z(r_2V_2-r_1V_1)$, where $r_1$ and $r_2$ are positive real coefficients and $f_z$ is a monotonic continuous function.

$V_c-(V_1+V_2)$ makes it possible to estimate the difference between passage through the contact area and outside the contact area. The result here is principally linked with Fy. An estimate of Fy is given by $f_y(s_cV_c-(s_1V_1+s_2V_2))$, where $s_1$, $s_2$ and $s_c$ are positive real coefficients and $f_y$ is a monotonic continuous function.

$V_c+V_1+V_2$ gives an indication of the overall shear of the bead. This value will be principally linked with the component Fx of the applied force. An estimate of Fx is given by $f_x(u_cV_c+u_1V_1+u_2V_2)$, where $u_1$, $u_2$ and $u_c$ are positive real coefficients and $f_x$ is a monotonic continuous function.

In this example four components (Fx, Fy, Fz and N) are estimated on the basis of three measurements of the circumferential shear stress. Indeed, there are cases in which the self-alignment torque is dependent directly and only on the components Fx, Fy and Fz. It can then be estimated as well. In the event that the self-alignment torque depends on other parameters, it is necessary to measure the circumferential shear stress in the bead at a greater number of azimuths, in order to estimate the said four force components correctly.

EXAMPLE 2

The intention is to estimate the components of the forces which are applied in the contact area, and the self-alignment torque, on the basis of measurements of the circumferential shear stress in the bead on one side of the tire, measured at five azimuths. The measurement azimuths are selected in the following way:

One of the azimuths corresponds to the middle of the contact area (azimuth 180°) or to the opposite side from the contact area (azimuth 0°). Let $V_c$ be the value measured at this point.

Two other azimuths are symmetrical with respect to the azimuth of the center of the contact area. (180°+α° and 180°−α°). Let $V_1$ and $V_2$ be the values measured at these points.

The final two azimuths are symmetrical with respect to the azimuth of the center contact area. (180°+β° and 180°−β°). Let $V_3$ and $V_4$ be the values measured at these points.

Combinations which are of the same nature as, but a little more complex than, those explained in Example 1 make it possible to determine the components Fx, Fy, Fz and N in this case, including cases in which the self-alignment torque is dependent not only on the components Fx, Fy and Fz.

The case in which the measurements are carried out on both beads will now be considered.

EXAMPLE 3

The intention is to estimate the components of the forces which are applied in the contact area, and the self-alignment torque, on the basis of measurements of the circumferential shear stress of both beads of the tire, measured at two azimuths on each bead. The measurement azimuths are selected symmetrically with respect to the azimuth of the center of the contact area (180°+α° and 180°−α°). So that Fx can be estimated, α must not be equal to 0° or 180°. Let $V_1^1$ and $V_2^1$ be the values measured at these azimuths on the first bead, and $V_1^2$ and $V_2^2$ the values measured at these azimuths on the second bead.

Thanks to these four values, it is possible to determine the components by using decomposition according to the azimuth-related and bead-related parities:

$V_1^1+V_1^2+V_2^1+V_2^2$ gives the azimuth-related and bead-related even component. This combination is therefore directly linked with Fx. An estimate of Fx is given by $f_x(a_1V_1^1+a_2V_2^1+b_1V_1^2+b_2V_2^2)$, where $a_1$, $a_2$, $b_1$ and $b_2$ are positive real coefficients and $f_x$ is a monotonic continuous function.

$V_1^1+V_1^2-(V_2^1+V_2^2)$ gives the azimuth-related odd and bead-related even component. This combination is therefore directly linked with Fz. An estimate of Fz is by $f_z(c_1V_1^1-c_2V_2^1+d_1V_1^2-d_2V_2^2)$, where $c_1$, $c_2$, $d_1$ and $d_2$ are positive real coefficients and $f_z$ is a monotonic continuous function.

$V_1^1-V_1^2+(V_2^1-V_2^2)$ gives the azimuth-related even and bead-related odd component. This combination is therefore directly linked with N. An estimate of N is given by $f_n(e_1V_1^1+e_2V_2^1-f_1V_1^2-f_2V_2^2)$, where $e_1$, $e_2$, $f_1$ and $f_2$ are positive real coefficients and $f_n$ is a monotonic continuous function.

$V_1^1-V_1^2-(V_2^1-V_2^2)$ gives the azimuth-related odd and bead-related odd component. This combination is therefore directly linked with Fy. An estimate of Fy is given by the real coefficients $f_y(g_1V_1^1-g_2V_2^1-h_1V_1^2+h_2V_2^2)$, where $g_1$, $g_2$, $h_1$ and $h_2$ are positive real coefficients and $f_y$ is a monotonic continuous function.

This type of arrangement makes maximum use of the symmetries of the tire, and very good precision may be expected when reconstructing the components of the constraint applied in the contact area.

EXAMPLE 4

The intention is to estimate the components of the forces which are applied in the contact area, and the self-alignment torque, on the basis of measurements of the circumferential shear stress in the bead on both sides of the tire, measured at three azimuths on each bead. The measurement azimuths are selected in the following way:

Two azimuths selected symmetrically with respect to the azimuth of the center of the contact area (180°+α° and 180°−α°). Let $V_1^1$ and $V_2^1$ be the values measured at these azimuths on the first bead, and $V_1^2$ and $V_2^2$ the values measured at these azimuths on the second bead.

One azimuth corresponding to the center of the contact area. Let $V_c^1$ and $V_c^2$ be the values measured at these azimuths. The azimuth which corresponds to the opposite side from the contact area can be used equivalently.

The processing is similar to that in Example 3. The values $V_c^1$ and $V_c^2$ allow a certain redundancy of the information, but above all better estimation of the component Fx.

The information about Fx is obtained with the aid of $V_c^1$ and $V_c^2$, and the information about Fz, Fy and N is obtained using $V_1^1$, $V_1^2$, $V_2^1$ and $V_2^2$. An additional possibility for decoupling the various contributions is hence used.

EXAMPLE 5

The intention is to estimate the components of the forces which are applied in the contact area, and the self-alignment torque, on the basis of measurements of the circumferential shear stress in the bead on both sides of the tire, measured at four azimuths on each bead. The measurement azimuths are selected in the following way:

Two azimuths selected symmetrically with respect to the azimuth of the center of the contact area (180°+α° and 180°−α°). Let $V_1^1$ and $V_2^1$ be the values at measured these azimuths on the first bead, and $V_1^2$ and $V_2^2$ the values measured at these azimuths on the second bead.

One azimuth selected with respect to the azimuth of the center of the contact area (180°+β). β is not equal to α. Let $V_3^1$ be the value measured at this azimuth on the first bead, and $V_3^2$ the value measured at this azimuth on the second bead.

One azimuth corresponding to the center of the contact area. Let $V_c^1$ and $V_c^2$ be the values measured at these azimuths. The azimuth which corresponds to the opposite side from the contact area can be used equivalently.

In this case, processing similar to cases 3 and 4 is applicable, with more robustness in view of the redundancy of the information. In addition to estimating the force components and the torque N, however, the stress measurements proposed here furthermore make it possible to provide an estimate of the camber angle, in the event that the latter is liable to vary. Indeed, the difficulty in this case involves determining the part of the two azimuth-related odd and bead-related odd contributions constituted by the component Fy and the camber angle.

The provision of measurements at two different angles with respect to the center of the contact area makes it possible to evaluate the slope of the signals as a function of the azimuth, and to discriminate an Fy effect from a camber effect. Carrying out the shear stress measurements in both beads allows the estimations to become much more robust in relation to the camber variation, and also allows to estimate the camber angle.

The linear combinations taken by way of example above are very rudimentary, and only allow the principal effects to be taken into account. With a view to refining the estimations of the components of the forces and to taking the non-linear behaviour of the tire into account, the described method resorts to more sophisticated transfer functions for relating the measurements to the estimates of the forces. Any interpolation function making it possible to establish a link between the measured quantities and the values of the selected characteristic or characteristics may be used in this context. Thus the coefficients of the interpolation function may be determined with the use of a training base (see below).

Although all the examples listed here use measurement azimuths which are selected so as to take maximum advantage of the symmetries of the tire and to facilitate reconstruction, the selection of the position of the azimuths at which the values are measured is free (symmetry of the azimuths is not obligatory per se), because any combination of a sufficient number of measurements makes it possible to estimate the components of the applied constraint. It is possible, in this case, to look directly for the functions giving the components Fx, Fy, Fz and N as a function of the measurements of the circumferential shear stress in the bead on one side or on both sides, at known azimuths. The determination of the transfer functions is no longer based necessarily on analysis of the mechanics of the tire, but rather on the response of the tire, in terms of circumferential shear stress in the bead on one side or on both sides, to the forces which it experiences.

Whether the measurement azimuths are selected thanks to a physical analysis or decided more arbitrarily, neural networks seem highly suitable for establishing a transfer function between the measurements which are carried out and the components of the forces Fx, Fy, Fz and N. If appropriate, the camber angle may also be one of the quantities to be estimated, and it may appear at the output of the transfer function for establishing the simplest applicable schemes, the use of networks having one layer of hidden neurons and one layer of output neurons may be adopted as the interpolation function for establishing a link between the measured quantities and the values of the components of the applied constraint. These hidden neurons use a sigmoid transfer function. The output neurons, for their part, use a linear transfer function (FIG. 7). The parsimony property of this type of network, when used as an approximator, is very beneficial here. It is possible to use one network per component to be estimated, or a network that makes it possible to estimate all the components thanks to a plurality of outputs.

If the measurement azimuths have been selected so as to take advantage of the symmetries or physical observations, it may be beneficial to make linear combinations of the quantities before input into the network. In this case, a principal component analysis will make it possible to determine the coefficients of these combinations expediently, and will simplify the required neural network. The architecture described in FIG. 8 is obtained, which shows examples of transfer functions for which the input linear combinations are optional. It is possible to use a network with a plurality of outputs, or a plurality of networks with one output, or any other combination. The possible output quantities (Fx, Fy, Fz, N, P and γ) are indicated, but they are of course optional.

Specifically, the operation is carried out as follows:

The first step, after having determined the measurement azimuths, consists in collecting the values of the circumferential shear stress in the bead on at least one side, during varied constraints of the tire which are selected so as to cover the full range in which evaluation of the selected characteristic or characteristics will be permitted in normal use. The selected constraints also need to involve all the couplings liable to be encountered during normal use. The set of measured values and the associated selected characteristic or characteristics (obtained by another measurement means) constitute the training base. Of course, in the event that the camber is subsequently liable to vary, it is desirable to incorporate variations of the camber angle which are representative of the future range of use into the training base.

The second step consists in carrying out the training of the weightings of the network (or, more generally, carrying out the determination of the coefficients of an interpolation function) on the base formed in this way. At the end of this phase, the transfer functions are obtained.

A third step consists in testing the transfer functions by comparing the estimates of the selected characteristic or characteristics with the values indicated by another measurement means.

Besides neural networks, it is possible to use polynomial functions, for example.

In the most realistic case, in which the inflation pressure of the tire is liable to change in the course of time, it may be necessary to take the pressure variations into account, depending on the precision desired for the measurement of the components in question.

A first procedure consists in correcting the estimated forces at the output of the transfer function as a function of the pressure. It is thus possible to carry out a first-order correction. Indeed, let there be a constraint applied to the tire in the event of a transfer function which does not take the pressure into account. If the pressure is double the reference pressure (at which the transfer function was established), the transfer function will see about two times less measured stresses as input than for the reference pressure. It will therefore evaluate forces that are two times weaker than the forces actually being applied. The estimated forces should be multiplied by two.

The most precise approach, however, consists in introducing the pressure as a parameter in the transfer functions. This involves:

Carrying out the training of the transfer function or functions on a training base containing cases in which the tire is constrained under various conditions of inflation pressure covering the desired range of operation.

Having at one's disposal a measurement or an estimate of the inflation pressure, by measurement of the stresses themselves or by another ancillary device.

Without implying any limitation, two ways of knowing the pressure will be described below. The first consists in using a pressure measurement given by a pressure sensor which is different from the stress sensors. The measured pressure value is then supplied to the transfer function or functions, in addition to the values of the stresses at the azimuths. FIG. 9a illustrates a schematic of the associated architecture.

The second approach consists in estimating the inflation pressure on the basis of the stress measurements. Indeed, the stress signals have a structural component and a pneumatic component, which makes it possible to obtain information about the inflation pressure by analysing them. This way of proceeding requires the determination of a transfer function which takes the measurements of stress at the desired azimuths as its input, and which gives an estimate of the inflation pressure over the intended range of operation. The same methodology as that presented above is applicable:

Formation of a training base which mixes variations in the applied forces and in the inflation pressure.
Determination of a Transfer Function by Training.

In practice, if the precision of a pressure determination performed as indicated above is deemed insufficient for a particular embodiment of the invention, it can be improved easily. Indeed, the change of the pressure in a tire is a phenomenon which is slow compared with the rotation of the tire. The pressure estimates can therefore be averaged or filtered so as to keep only the low-frequency components. A good estimate of the inflation pressure is then obtained. FIG. 7b schematises the architecture which results from this approach. Besides knowledge of the resultants of forces in question, the method then provides an estimate of the inflation pressure without any additional sensor.

Naturally, many other variables (in addition to the measurements of the circumferential shear stress in the bead) may be taken into account according to the same principle, in order to improve the efficiency of this determination. Such is the case, for example, concerning the temperature of the tire or the speed of rotation. Indeed, depending on the type of sensor and the position of the measurement, it may be that the stress signals which are obtained depend slightly on the speed of rotation of the tire. In order to improve the precision of the estimates, it may then be beneficial to add the speed of rotation as an input parameter of the transfer function. Knowledge of the speed may then come from a measurement carried out by another component installed on the vehicle or, for example, it may be extracted from the stress signals themselves.

In general, the number of measurement points may be higher than the minimal configurations presented in the examples, and may permit a result which is more precise or more reliable because of the redundancy of the available information.

An alternative way of increasing the precision or the robustness of the method consists in using a multi-dimensional measurement instead of a one-dimensional measurement. For example, and without implying any limitation, both a circumferential shear stress and a transverse shear stress may be used, the two quantities being measured preferably, but without implying any limitation, simultaneously by the same two-dimensional sensor at the same position.

The use of these two stresses makes it possible to provide a configuration, in which a single bead is equipped with sensor(s), which is as robust in terms of performance and as precise as a configuration in which both beads are equipped. In particular, this configuration makes it possible to measure the camber even though just one bead is equipped with sensor(s), which is not possible when using a one-dimensional sensor in a single bead.

In this case, the inputs of the transfer function consist of an assortment of measurements of one or the other or different types of stresses at various azimuths. Apart from this difference, exactly the same procedure is used for determining the transfer function. This approach turns out to be very beneficial because, in terms of producing the final product, it may be much simpler and less expensive to equip only a single bead, even if the sensor itself is more expensive to manufacture.

The measurement of the shear stress in the bead 1, on one side or on both sides of the tire, may be performed in any manner, using a device which is external to the tire or a device which is internal to the tire. By way of example, the use of one or more sensors 3 which are placed in the tire in an anchoring zone 2 of the carcass, and which are therefore carried along in rotation by the tire, will be described here for measuring the circumferential shear stress in the bead 1.

This sensor or these sensors 3, integrated with the tire and locally measuring the circumferential shear stress of the bead or beads, may employ any physical measurement principle. They may, for example, consist in a test body 30 equipped with stress gauges 31, for example resistive gauges. Deformation of the test body leads to a modification of the resistance of the stress gauges 31 bonded to its surface (FIGS. 10, 11 and 12). Via a Wheatstone bridge, the two gauges 31 placed on either side of the test body 30 then provide a signal which is strongly linked with the circumferential shear stress. If it is active, the sensor 3 may be powered either by the vehicle, using wireless supply, or by a battery installed on the wheel or in the tire, or by any other means. Everything is also possible concerning the transmission of the information to the vehicle, by radio or other means. The sensor 3 per se must be capable of delivering information continuously, or with a refresh frequency which is fast enough in relation to the period of rotation of the wheel.

One possible variant of the sensor 3 consists in using piezoelectric elements instead of the stress gauges 31. The piezoelectric elements are connected to a charge amplifier, which makes it possible to deliver a voltage proportional to the flexure of the test body. This variant has the benefit of not only providing a measurement signal, but also potentially of supplying electrical energy to the circuits for processing and/or for transmitting the information.

For measuring the circumferential shear and transverse shear stresses, it is also possible to use a sensor of the type described in Patent Application EP02/014144, placed in the bead. This Application describes a force sensor of the nail type, having a rigid stem intended to be constrained by the force to be picked up, and a head which has an element that is secured to the stem and is intended to be deformed or stressed when the stem is constrained. The nail-type sensor is arranged at the same position as the sensor 3 shown in FIG. 11, the stem being oriented substantially radially and towards the largest radii, or alternatively the stem being oriented substantially perpendicularly to the orientation indicated above, and towards the internal cavity of the tire.

This approach, using a sensor 3 or the like integrated with the tire, has the advantage of making it possible to know the shear stress in the bead on one side or on both sides, and at all the azimuths of the tire, since a sensor 3, when being carried along by the tire, explores all the azimuths during a rotation of the wheel.

The fact that the method of reconstructing the components of the forces is based on measuring the circumferential shear stress at certain azimuths entails the problem of locating the sensor 3 in order to extract the values at the correct azimuths.

The sensor 3 is interrogated, or delivers on its own a measurement, at a constant and known frequency. It therefore delivers a time signal of the variation in the local circumferential shear stress. A measured signal is presented in FIG. 10. On this time signal, it is easy to see the signature of a wheel revolution which was observed previously (FIGS. 2a, 2b, 3a, 3b, 4a and 4b). Further to the signature of each wheel revolution, this signal contains noise. The first operation consists in reducing this noise by applying a low-pass filter, the cut-off frequency of which may be linked with the speed of rotation of the wheel.

Several cases may then arise, depending on the available equipment:

If a measurement of the angular position of the wheel is available, it is possible to know the instants at which the sensor 3 passes through the measurement azimuth. Reading the values measured at these instants provides the value of the shear stress at the desired azimuths. This measurement of the angular position of the wheel may, for example, be obtained by counting the transitions of an ABS sensor for the speed of rotation of the wheel.

If no external device is available to facilitate the location of the sensor 3, only the signal of the sensor itself can be used. The invention proposes to use the signal of the sensor, or of other sensors, if any, integrated with the tire, in order to estimate the angular position of the wheel.

Each passage of the sensor 3 through the contact area has, as its signature, a rapid variation of the shear stress in the bead, which leads to a pronounced slope. By using this observation, it is possible to find the instants at which the sensor 3 passes through the center of the contact area. The simplest method for carrying out this operation consists in differentiating the filtered signal with respect to time, so as to ascertain the slope at each instant. The differentiated signal which is obtained has an extremum during passage through the center of contact area. It is then possible to carry out thresholding of this differentiated signal and to look for the maxima among the values greater than this threshold ("algorithm 1"—FIG. 14). This approach makes it possible to avoid detecting the maxima which do not correspond to passage through the contact area. The instants at which the extrema have been located correspond to the instants at which the sensor 3 passes through the center of the contact area.

The shape of the signal changes substantially as a function of the applied forces. In real conditions, the thresholding may turn out to be complicated, because the level of the threshold needs to be adapted constantly. Furthermore, under certain conditions, it may happen that the application of a threshold causes the detection of several extrema per wheel revolution. This situation is encountered when a large force Fy is applied. One possible approach, but not the only approach, consists in using the following algorithm:

Using by default the previously explained algorithm, referred to as 'algorithm 1'.

When a periodicity is detected, using the date of the last passage through the contact area, and an evaluation of the speed based on the last passages, in order to predict the date $t_n$ of the future passage through the contact area.

Defining a signal window $[t_n-d; t_n+d]$ around $t_n$ with the aid of an uncertainty, d being less than half the period of the signal.

Carrying out the thresholding in this window in order to determine the true date $T_n$ which corresponds to the approximation $t_n$.

Performing a new iteration in order to detect the next revolution. In the event of an error (visibly false period, extremum found at the edge of the window, etc.) repeating 'algorithm 1' in order to re-synchronise the process.

Each time another passage through the contact area is determined, knowledge of the instants of the last passages (at least 3 passages) makes it possible to estimate the speed of rotation of the wheel and its acceleration. Thanks to these estimates, it is possible to reconstruct an evaluation of the azimuth at which the sensor 3 lies as a function of time. It then becomes possible to extract the values at certain azimuths from the measurements as a function of time.

As seen above, the estimate of the speed of rotation can be used as an input of the transfer function, in order to improve the precision of the estimation of the force components over a large range of speeds.

Several options are then available for implementing the measurement. Indeed, determining the components of the forces requires measurements at a plurality of azimuths.

A first approach consists in using only one sensor 3 in each bead for which measurements are intended to be obtained. At each passage through a required position, the value given by the sensor is taken into account in order to refresh the measurement at the azimuth in question. By making the assumption that the components of the forces vary slowly in relation to the speed of rotation of the wheel, a single sensor thus makes it possible to obtain the measurements at all the azimuths necessary for reconstruction of the forces. FIG. 15 presents this type of operation with a model (transfer function) which requires measurements at three azimuths (0°, 120° and 240°).

A second approach consists in providing a plurality of sensors 3 over the circumference, so that, at least once per revolution, the sensors simultaneously lie at the azimuths where a measurement is intended to be carried out. It is thus possible to obtain an image of the deformation of the tire at various azimuths at a given instant, which no longer requires that the forces vary slowly in relation to the rotation of the wheel. Ideally (maximum passband), the number of sensors has to be at least equal to the number of quantities to be estimated. One implementation of this approach consists in providing the sensors 3 in an equally distributed fashion around the tire. Hence, in the event that N sensors 3 have been fitted, the situation in which the sensors are correctly positioned occurs at least N times per revolution. FIG. 16 presents this type of operation with three sensors, which arrive three times per revolution at the azimuths where the measurement is to be carried out (0°, 120° and 240°).

Lastly, it is possible to mix the approaches above.

Increasing the number of sensors makes it possible, in particular:

to increase the refresh frequency of the estimation of the forces, and therefore the passband of the system to increase the robustness with respect to rapid variations of the components of the forces which are applied in the contact area.

It should be noted that it is possible to determine a plurality of models which take the measurements at different azimuths as their input. Even with a single sensor, it is thus possible to obtain a plurality of estimates during each wheel revolution.

FIG. 17 gives an example in which three sensors are used. Two transfer functions are determined. The first uses measurements at 0°, 120° and 240°, the second at 60°, 180° and 300°. When the sensors arrive at the desired measurement positions, the transfer function can be applied. By suitably managing the sensors, it is even possible in this type of arrangement to estimate the forces 6 times per wheel revolution. These estimates by a plurality of models may be averaged or compared in order to increase the precision and reduce the noise in the estimation of the forces.

What is claimed is:

1. A method of determining at least one characteristic of a tire selected from: the x component, y component, and z component of a resultant of forces which are exerted by the road on the contact area of a tire, the self-alignment torque generated by the tire, the camber and the pressure, the method comprising the steps of measuring stresses in at least one bead of the tire at at least three fixed points in space, and deriving the characteristic from said at least one measurement.

2. The method according to claim 1, wherein the measurement of the stresses is performed in a rubber component whose Young's modulus is more than 5 MPa at 10% strain.

3. The method according to claim 1, the said three fixed points being selected such that:

one of the points corresponds to the azimuth of the center of the contact area or the azimuth of the point opposite to the contact area; and, two other points are symmetrical with respect to a vertical plane passing through the center of the contact area.

4. The method according to claim 3, in which, the measurement azimuths being selected symmetrically with respect to the azimuth of the center of the contact area (180°+α and 180°−α°), with α not equal to 0° or 180°, $V_1^1$ and $V_2^1$ being values measured at these azimuths on a first bead and $V_1^2$ and $V_2^2$ being the values measured at these azimuths on a second bead, an estimate of the component Fx is provided by $f_x(a_1V_1^1+a_2V_2^1+b_1V_1^2+b_2V_2^2)$, where $a_1$, $a_2$, $b_1$ and $b_2$ are positive real coefficients and $f_x$ is a monotonic continuous function.

5. The method according to claim 3, in which, the measurement azimuths being selected symmetrically with respect to the azimuth of the center of the contact area (180°+α and 180°−α°), with α not equal to 0° or 180°, $V_1^1$ and $V_2^1$ being values measured at these azimuths on the first bead and $V_1^2$ and $V_2^2$ being values measured at these azimuths on the second bead, an estimate of the component Fz is provided by $f_z(c_1V_1^1-c_2V_2^1+d_1V_1^2-d_2V_2^2)$, where $c_1$, $c_2$, $d_1$ and $d_2$ are positive real coefficients and $f_z$ is a monotonic continuous function.

6. The method according to claim 3, in which, the measurement azimuths being selected symmetrically with respect to the azimuth of the center of the contact area (180°+α and 180°−α°), with α not equal to 0° or 180°, $V_1^1$ and $V_2^1$ being values measured at these azimuths on the first bead and $V_1^2$ and $V_2^2$ being values measured at these azimuths on the second bead, an estimate of the self-alignment torque N is provided by $f_n(e_1V_1^1+e_2V_2^1-f_1V_1^2-f_2V_2^2)$, where $e_1$, $e_2$, $f_1$ and $f_2$ are positive real coefficients and $f_n$ is a monotonic continuous function.

7. The method according to claim 3, in which, the measurement azimuths being selected symmetrically with respect to the azimuth of the center of the contact area (180°+α and 180°−α°), with α not equal to 0° or 180°, $V_1^1$ and $V_2^1$ being values measured at these azimuths on the first bead and $V_1^2$ and $V_2^2$ being values measured at these azimuths on the second bead, an estimate of the component Fy is provided by $f_y(g_1V_1^1-g_2V_2^1-h_1V_1^2+h_2V_2^2)$, where $g_1$, $g_2$, $h_1$ and $h_2$ are positive real coefficients and $f_y$ is a monotonic continuous function.

8. The method according to claim 3, in which, the measurement azimuths being selected symmetrically with respect to the azimuth of the center of the contact area (180°+α and 180°−α°), with α not equal to 0° or 180°, and $V_1$ and $V_2$ being values measured at these other azimuths, an estimate of Fz is provided by $f_z(r_2V_2-r_1V_1)$, where $r_1$ and $r_2$ are positive real coefficients and $f_z$ is a monotonic continuous function.

9. The method according to claim 3, in which, one of the azimuths corresponding to the middle of the contact area (azimuth 180°) and $V_c$ being a value measured at this azimuth, the other measurement azimuths being selected symmetrically with respect to the azimuth of the center of the contact area (180°+α and 180°−α°), with α not equal to 0° or 180°, and $V_1$ and $V_2$ being values measured at these other azimuths, an estimate of Fy is provided by $f_y(s_cV_c-(s_1V_1+s_2V_2))$, where $s_1$, $s_2$ and $s_c$ are positive real coefficients and $f_y$ is a monotonic continuous function.

10. The method according to claim 3, in which, one of the azimuths corresponding to the middle of the contact area (azimuth 180°) and $V_c$ being a value measured at this azimuth, the other measurement azimuths being selected symmetrically with respect to the azimuth of the center of the contact area (180°+α and 180°−α°), with α not equal to 0° or 180°, and $V_1$ and $V_2$ being values measured at these other azimuths, an estimate of Fx is provided by $f_x(u_cV_c+u_1V_1+u_2V_2)$, where $u_1$, $u_2$ and $u_c$ are positive real coefficients and $f_x$ is a monotonic continuous function.

11. The method according to claim 1, wherein to estimate camber angle, the method comprises determining a difference in stresses being exerted in each of the beads on the basis of the measurements of stresses in the beads.

12. The method according to claim 1, wherein, to estimate pressure a contribution due to the pneumatic behaviour separate from a contribution due to structural behaviour is determined on the basis of the measurements of stresses in the beads.

13. A method of determining at least one characteristic of a tire selected from: the x component, y component and z component of a resultant of forces which are exerted by the road on the contact area of the tire, the self-alignment torque generated by the tire, the camber, and the pressure, the method comprising the steps of:

determining measurement azimuths and collecting values for circumferential shear stress in a bead on at least one side of the tire while soliciting varied stresses on the tire, which stresses are selected to cover the full range in which evaluation of the at least one selected characteristic will be permitted in normal use, the solicited stresses selected to create all the couplings expected during normal use, reading measured values for circumferential shear stress in the bead and reading values of the at least one characteristic associated with the measured values to form a training base, the values of the at least one characteristic being obtained through measurement means different from the means for the measured values, determining coefficients of a transfer function for establishing a link between the measured values and the values of the at least one selected characteristic on the basis of the training base, and, testing the transfer functions by making and comparing estimates of the at least one selected characteristic with the values obtained by different measurement means.

14. The method of determination according to claim 13, in which the transfer function is a network having one layer of hidden neurons and one layer of output neurons.

* * * * *